United States Patent Office 3,508,967
Patented Apr. 28, 1970

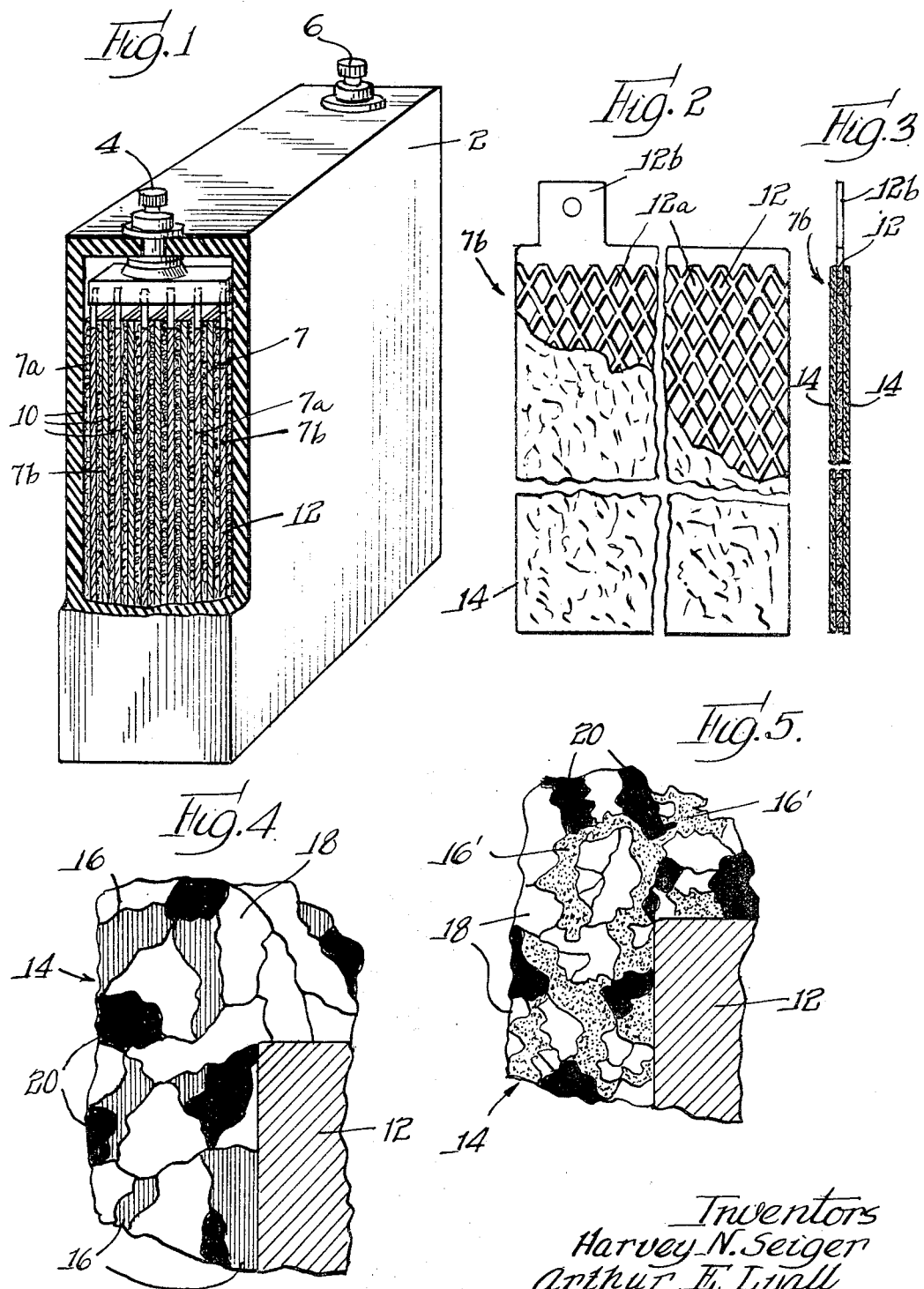

3,508,967
NEGATIVE LITHIUM ELECTRODE AND ELECTROCHEMICAL BATTERY CONTAINING THE SAME
Arthur E. Lyall, Bridgewater, and Harvey N. Seiger, East Brunswick, N.J., assignors to Gulton Industries, Inc., Metuchen, N.J., a corporation of New Jersey
Filed Sept. 22, 1967, Ser. No. 669,802
Int. Cl. H01m 35/02
U.S. Cl. 136—20
16 Claims

ABSTRACT OF THE DISCLOSURE

A rechargeable battery is provided with a lithium electrode which comprises a reinforcing grid support made on an inactive material, most preferably one having a noble metal coating, upon which grid support there is compacted a comminuted mixture having, as essential ingredients, powered lithium metal and particles of permanently conductive material, preferably degassed granular carbon or deoxidized filamentous nickel powder, in extensive electric contact with one another and held together on the grid support by a minor proportion of a binder material which is most desirably particles of polyethylene which have been softened and compacted with said comminuted mixture, or carboxymethylcellulose applied as a porous adhesive coating on the lithium particles and the particles of permanently conductive material.

---

The present invention is directed to rechargeable batteries having unique electrode compositions and constructions. The battery of the present invention utilizes electrode materials which are extremely reactive to hydrogen, oxygen and water, thereby requiring nonaqueous electrolytes. In its most advantageous form the invention utilizes lithium as the active negative electrode material and, by way of example, a nickel halide as the active positive electrode material in the charged states thereof.

The demands made in both space and terrestrial batteries for higher watt hour per pound ratios have spured the development of new battery systems, among them being battery systems using materials like lithium as electrode materials. Lithium is the most active metal in the periodic table since it will react spontaneously with any active hydrogen compound, and will react with such elements as hydrogen, oxygen, halogen and even the relatively inert gas nitrogen. Thus, the use of lithium as a battery electrode material creates significant corrosion problems.

The first attempts at making batteries with lithium negative electrodes utilized lithium foil supported on gridlike carrier structures. When such a battery utilizes nickel fluoride as the active positive electrode, on discharge the lithium metal is oxidized to lithium fluoride which is a nonconductor having little or no self-adhesion, and the nickel fluoride is reduced to metallic nickel in accordance with the following reaction formula:

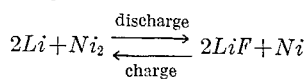

The lithium fluoride flakes off the carrier structure and may be partially dissolved in the electrolyte. When the battery is charged, the lithium fluoride is reduced to lithium which plates out upon the carrier structure partially to reconstitute the negative electrode. The low conductivity of the lithium fluoride in this battery requires very low charge rates to avoid or minimize polarization. The low permissible charge rates and lack of integrity of the lithium electrode provides a very unsatisfactory battery.

The present invention provides an improved lithium electrode composition and construction which enables the battery to be recharged at charge rates materially greater than with batteries having the lithium electrode construction described above, without polarization problems, and provides a lithium electrode which maintains its integrity.

In accordance with one of the aspects of the invention, instead of utilizing lithium in foil form, the lithium electrode comprises a comminuted mixture of lithium powder and particles of permanently conductive material in extensive electrical contact and held together by a binder upon a grid support structure upon which the mixture is compacted. The binder must be of a type and in amounts which do not interfere with the extensive electrical contact between the particles involved and it must be compatible with the electrolytes involved. When the battery is discharged, the resultant nonconductive lithium salt particles are kept by the binder in situ so the particles of permanently conductive material remain in extensive electrical contact with the lithium salt. The permanently conductive particles in extensive electrical contact with the lithium salt provide throughout the body of the lithium electrode points where electrons are readily available to reduce the lithium salt to lithium metal during the charging of the battery, so that there is no polarization problem with this electrode. This electrical contact may be made by direct physical contact between the particles or by a very low resistance path provided by a film of electrolyte therebetween.

The selection of the particles of permanently conductive material and the particle size thereof and of the lithium powder are very important to the operation of the lithium electrode. Thus, the particles involved should preferably have a very fine particle size, for example, a particle size no greater than about 100 mesh; and, although silver particles could be used for peranently conductive material, because of the expense and weight of silver it is much more desirable to use nickel powder or degassed granular carbon. With lithium as the active negative electrode material, as previously indicated, it is of extreme importance to avoid the presence of moisture and gases like oxygen and nitrogen. The reason for the use of granular carbon instead of filamentous carbon is because it is extremely difficult to degas carbon in the filament form. It has also been found that commercial nickel particles are commonly in a partially oxidized state, so that it is of especial importance to deoxidize the nickel particles before being incorporated into the lithium electrode. Also, filamentous nickel, such as carbonyl nickel, provides a much more effective surface area for contact with the lithium particle than other forms of nickel.

As above indicated, the selection of the binder material is also extremely important. Most binders, such as polyvinyl alcohol, must be applied in a water solvent which, as previously indicated, cannot be tolerated in the fabrication of lithium electrodes. Also, most binder materials are soluble in the non-aqueous electrolytes found useful in the lithium battery to be described. Two materials found to provide an especially good binder are polyethylene and carboxymethylcellulose. Where carboxymethylcellulose is utilized, it is dissolved in an organic solvent, such as dimethylsulfoxide, and added to a slurry of lithium powder and permanently conductive material in a vacuum or inert atmosphere. The slurry is compacted into a grid support structure made of a conductive material and the result body is dried which leaves an adhesive coating of the carboxymethylcellulose over the various particles of lithium and permanently conductive material which permanently binds the particles together upon the grid support structure. The carboxymethylcellulose coating is a porous material so that it does not prevent good electrical contact between the particles involved and the grid support structure through the electrolyte which is applied thereto. The self-adhesion of the carboxymethylcellulose coatings of the particles involved provides the adhesion necessary to maintain the integrity of the electrode.

The preferred binder is polyethylene in finely divided form, such as the particulate polyethylene sold under the trademark Microthene by U.S. Industrial Chemicals, Inc. The polyethylene is a thermoplastic inert material which acts as an excellent binder when compression and heat are applied to a slurry of the binder and other particles as it is compressed onto the above mentioned grid support structure.

The grid support structure should be carefully selected so that it is not corroded by the electrolyte in the battery and also so gassing and other undesirable reactions do not take place in the battery. It has, for example, been found that a grid support structure having a noble metal outer surface was especially advantageous.

Although the quantities of the various constituents of the lithium electrodes may vary widely in accordance with the broad aspects of the invention, it has been found that greatly superior results are achieved if the molar ratio of the permanently conductive particles to the lithium particles is at least about 1 to 9 and the binder is no less than about 5% and no more than about 20% by bulk volume of the overall lithium conductive particle binder mixture. The amount of lithium powder utilized in each electrode, of course, is determined by the desired ampere hour rating and size requirements of the battery involved. Also, the comminuted mixture of lithium powder, particles of permanently conductive material and binder are compacted most advantageously at a pressure of at least 500 pounds per square inch and preferably higher, such as 2 tons per square inch.

One specific example of a method of making the lithium electrode is as follows: Expanded Monel 400 mesh screens 0.005 inch thick, with the long dimension of the expanded slits 0.046 inch, are covered in an argon atmosphere in a glove box on both sides thereof with a paste of 90-mole percent lithium powder at or under 100 mesh size, 10-mole percent nickel powder at or under 100 mesh size in a mineral oil vehicle to form a thick slurry, and a binder, such as carboxymethylcellulose dissolved in dimethylsulfoxide, or polyethylene particles, said binder comprising about 2% of the dry weight of the lithium-nickel mixture. The carboxymethylcellulose solution in dimethylsulfoxide should be concentrated or substantially saturated but still reasonably readily pourable.

The resulting electrodes are placed in a polyethylene bag and sealed. The bag is removed from the glove box and applied to a press applying a force of preferably 2 tons per square inch to the electrodes. The compressed electrode is returned to the glove box and removed from the bag. The electrodes are then transferred to a vacuum oven to dry the same by heating to 120° C. under a vacuum of 29 inches of mercury. The electrodes are then placed in the glove box and the mineral oil removed by washing with hexane.

Although the compositions and constructions described have their most important application in lithium electrodes, powdered active metal particles of permanently conductive material and the binder compositions described compacted onto a screen also have application to other electrodes, such as the positive nickel halide electrode of the preferred battery of the invention, where the active material in one of the states is a poor conductor and has poor self-adhesion. Filamentous carbon, such as acetylene black, is most desirable for the particles of permanently conductive material used in nickel halide electrodes because it has a maximum surface area for a given weight of the material. (Manifestly, nickel powder cannot be used for this purpose in a positive electrode.) An especially good nickel fluoride electrode comprises a Monel 400 expanded metal screen having compacted thereon a mixture of about 67.5% of nickel flouride powder, about 22.5% of acetylene black, and about 10% of polyethylene particles, said percentages being by weight.

Although the electrode constructions made in accordance with the present invention can be utilized with a variety of non-aqeuous electrolytes, the electrolytes used therewith in the lithium-nickel halide battery system most advantageously have the specifications and compositions disclosed in the portion of the specification to follow. Such electrolytes are disclosed and claimed in application Ser. No. 669,803, filed by Arthur E. Lyall on even date herewith.

The electrolyte for the lithium-nickel halide battery comprises a nonaqueous solvent, a solute to conduct current and supply ions for the reactions, and a depolarizing agent for the nickel halide electrodes. The solvent is an organic liquid having a wide liquid range from below normal room temperature to above 60° C. It must be a polar compound essentially void of active hydrogen or of hydroxyl groups. It should have a dielectric constant greater than 38, but, if the solubility of the solute is great enough, the effect of the dielectric constant is diminished. A viscosity of less than 3 cps. is desirable but not imperative. Illustrative examples of such solvents are propylene carbonate, dimethylsulfoxide, gamma butyrolactone, and N-methyl-2 pyrrolidone.

The solute can consist of only the electrochemically active species of ions or it can also include a supporting electrolyte solute which aids in carrying current by reducing the voltage drop. The use of salts of hexafluorophosphoric acid as the electrolyte solute is an example of the former case where the positive electrode in the charged state is nickel fluoride. When the positive electrode is nickel fluoride. When the positive electrode is nickel chloride, the electrolyte solute most advantageously comprises a salt of hexafluorophosphate as a supporting electrolyte and a quantity of lithium chloride. Some specific examples of the useful salts of hexafluorophosphate are potassium hexafluorophosphate ($KPF_6$), lithium hexafluorophosphate ($LiPF_6$), and tertiary amine salts, such as phenyltrimethylammonium hexafluorophosphate

and tetramethylammonium hexafluorophosphate

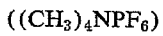

The depolarizing agent for the nickel halide electrodes is added in small quantities to reduce the cathode overpotential for both charge and discharge conditions. An illustrative example of a suitable depolarizing agent is lithium levulinate ($CH_3CO(CH_2)_2COOLi$).

There are two features which make these electrolytes of value for use with the lithium batteries. First, they are compatible with lithium and the cathode materials used in conjunction with the lithium electrode. That is, there is no corrosion or spontaneous reaction between the electrolyte and the battery components. The second feature is that the conductivity of the electrolyte is sufficient that the internal voltage drop does not prevent the cell from being discharged at usable rates. For practical purposes the conductivity of the electrolyte should be greater than $10^{-3}$ mhos per cm.

The most advantageous form of the lithium-nickel halide battery system uses potassium hexafluorophosphate as the solute and propylene carbonate or dimethylsulfoxide as the solvent. Potassium hexafluorophosphate is an especially good solute in the electrolyte because it results in a very low self-discharge of the battery so the battery has a good shelf life. When the positive electrode is nickel chloride instead of nickel fluoride, the solvent is most advantageously propylene carbonate. In such case, dimethylsulfoxide should not be used as the electrolyte solvent because it dissolves nickel chloride.

Specific examples of suitable electrolytes for the lithium-nickel fluoride battery are a solution of 90 grams of potassium hexafluorophosphate per liter of propylene carbonate, which has a conductivity of 25° C. of $72 \times 10^{-3}$ mhos per cm., and 190 grams of potassium hexafluorophosphate per liter of dimethylsulfoxide, which has a conductivity of $11.6 \times 10^{-3}$ mhos per cm. at 25° C.

As above indicated, the grid support structure or screen is most advantageously made of an expanded metal, as for example, Monel metal or nickel. The Monel or nickel screen provides a most satisfactory substrate when the electrolyte solvent is dimethylsulfoxide. However, when propylene carbonate is utilized as the solvent, it has been found that there is gassing of the nickel grid support structure. By coating the Monel or nickel screen with a noble metal, particularly platinum or gold, the gassing problem is essentially eliminated.

An exemplary lithium electrode and battery construction is shown in the drawings wherein:

FIG. 1 illustrates a sealed rechargeable battery to which the present invention is applied;

FIG. 2 is a greatly enlarged, broken-away side elevational view of a lithium electrode utilized in the battery of FIG. 1;

FIG. 3 is a broken-away end elevational view of the electrode of FIG. 2;

FIG. 4 is a microscopic view of one form of lithium electrode constructed in accordance with the present invention; and FIG. 5 is a microscopic view of another form of lithium electrode of the present invention.

Referring now to FIG. 1, the sealed rechargeable battery there shown includes an outer casing 2 made of insulating material and respectively having positive and negative terminals 4 and 6 exposed on the outside of the casing. Within the casing is an electrode assembly 7 made of positive and negative electrode plates 7a and 7b, the positive and negative plates alternating in the assembly and separated by separators 10 made of an electrolyte-impregnated material, such as non-woven polypropylene felt.

All of the positive electrode plates 7a are connected to the positive terminal 4 of the battery casing by any suitable means, and all of the negative electrode plates 7b are connected to the negative terminal 6 by any suitable means.

FIGS. 2 through 4 illustrate the construction of the negative lithium electrode plates 7b. Each plate 7b includes a grid support structure 12, most advantageously made of expanded metal, providing perforations 12a. The grid support structure 12 has a terminal tab 12b, at the upper edge thereof. The grid support structure has compacted on each side thereof, in the manner previously explained, a layer 14 comprising a comminuted mixture 14 of lithium particles, particles of a permanently conductive material and a binder. FIG. 4 illustrates one form of the invention wherein the binder comprises discrete polyethylene particles 16 which bind together the lithium particles 18 and particles of permanently conductive material 20 upon the grid support structure 12. As previously indicated, the lithium particle 18 and the particles 20 of permanently conductive material are in extensive intimate physical and electrical contact with one another and the grid support structure.

Referring now to FIG. 5 which illustrates another form of the invention wherein the binder comprises coatings 16' of carboxymethylcellulose on the various particles 18 and 20, said coatings 16' are porous so that the impregnation of the negative electrode plate 7b with electrolyte, due to the contact of the negative electrode with the electrolyte impregnated separator 10, will form a short highly conductive path between the coated particles. As previously indicated, the binder 16 or 16' keeps the lithium or lithium halide particles in situ at all times.

The positive electrode plates 7a which may be made of a nickel halide, may be constructed in a manner similar to that of the lithium electrode shown in FIGS. 2 through 4 with the lithium or lithium halide particles replaced by nickel or nickel halide particles, and the particles of permanently conductive material most preferably a filamentous carbon like acetylene black.

It should be understood that numerous modifications may be made in the most preferred form of the invention described above without deviating from the broader aspects thereof.

We claim:

1. A lithium electrode having particular utility for use in nonaqueous rechargeable batteries which comprises a reinforcing grid support upon which there is supported a compacted comminuted mixture containing, as essential ingredients, active powdered essentially nonfused lithium metal and particles of permanently conductive material in extensive intimate electrical contact with the lithium particles, the lithium particles and the particles of conductive material being held together and to the grid by a minor proportion of an inert binder distributed throughout the mixture.

2. The lithium electrode of claim 1 wherein the molar ratio of the particles of permanently conductive material to the lithium particles is at least about 1 to 9.

3. The lithium electrode of claim 1 wherein said powdered lithium and particles of permanently conductive material have a particle size of the order of about 100 mesh or less.

4. The lithium electrode of claim 1 wherein said conductive particles are degassed granular carbon or essentially oxygen-free nickel powder.

5. The lithium electrode of claim 4 wherein the nickel powder is filamentous nickel.

6. The lithium electrode of claim 1 wherein the binder constitutes from about 5 to 20% of the bulk volume of said mixture.

7. A rechargable battery comprising: at least one positive electrode; at least one negative electrode comprising a reinforcing grid support upon which there is supported a compacted comminuted mixture containing, as essential ingredients, powdered essentially nonfused lithium and particles of permanently conductive material in extensive intimate electrical contact with one another and held together on the grid support by a minor proportion of an inert binder; and a non-aqueous electrolyte.

8. The battery of claim 7 wherein said binder comprises particles of polyethylene which have been softened and compacted with said comminuted mixture or carboxymethylcellulose forming a porous adhesive coating over the lithium particles and the particles of permanently conductive material.

9. The battery of claim 7 wherein the binder constitutes from about 5 to 20% by bulk volume of said mixture in said negative electrode.

10. The battery of claim 7 wherein said particles of permanently conductive particles in the mixture of said negative lithium electrode are degassed granular carbon or essentially oxygen-free nickel powder.

11. The battery of claim 9 wherein said reinforcing grid support structure of said negative lithium electrode is covered with a noble metal.

12. The battery of claim 7 wherein the molar ratio of the particles of permanently conductive material to the lithium particles is at least about 1 to 9 in each negative electrode.

13. The battery of claim 7 wherein said powdered lithium metal and particles of permanently conductive material of the negative electrode have a particle size of the order of about 100 mesh or less, said grid support structure of the negative electrode has an outer surface of a noble metal, said particles of permanently conductive material are degassed granular carbon or deoxidized nickel powder, and said binder comprises particles of polyethylene which have been softened and compacted with said comminuted mixture of carboxymethylcellulose applied as a porous adhesive coating on the lithium particles and the particles of permanently conductive material.

14. A rechargeable battery comprising: at least one positive electrode; at least one negative electrode; at least one of said electrodes being chemically reactive with water and oxygen, the reactive one of said electrodes comprising a reinforcing grid support upon which there is supported a compacted comminuted mixture containing, as essential ingredients, a powdered essentially non-fused alkali metal forming the active material in the battery which is reactive with water and oxygen and a binder material comprising particles of polyethylene which have been softened and campacted with said comminuted mixture or carboxymethylcellulose applied as a porous adhesive coating on said powdered metal particles and the particles of permanently conductive material; and a nonaqueous electrolyte which is not a solvent for said binder material.

15. The battery of claim 14 wherein said nonaqueous electrolyte is a salt dissolved in propylene carbonate, dimethyl-sulfoxide, gamma butyrolactone, or N-methyl-2 pyrrolidone.

16. The battery of claim 15 wherein the salt is a salt of a hexafluorophosphoric acid.

References Cited

UNITED STATES PATENTS

| | | | |
|---|---|---|---|
| 2,708,683 | 5/1955 | Eisen | 136—20 |
| 2,737,541 | 3/1956 | Coolidge | 136—20 |
| 2,977,401 | 3/1961 | Marsal et al. | 136—120 |
| 3,121,029 | 2/1964 | Duddy | 136—120 |
| 3,184,339 | 5/1965 | Ellis | 136—120 |
| 3,223,555 | 12/1965 | Solomon et al. | 136—120 |
| 3,271,195 | 6/1966 | Berchielli et al. | 136—120 |
| 3,393,092 | 7/1968 | Shaw et al. | 136—6 |
| 3,395,048 | 7/1968 | Parvolic | 136—120 |

WINSTON A. DOUGLAS, Primary Examiner

C. F. LE FEVOUR, Assistant Examiner

U.S. Cl. X.R.

136—6, 120